(12) United States Patent
Schöler et al.

(10) Patent No.: US 9,711,959 B2
(45) Date of Patent: Jul. 18, 2017

(54) CHAIN LINK

(75) Inventors: Dirk Schöler, Wilnsdorf (DE); Jochen Bensberg, Hilchenbach (DE)

(73) Assignee: TSUBAKI KABELSCHLEPP GmbH, Wenden-Gerlingen (DE)

( * ) Notice: Subject to any disclaimer, the term of this patent is extended or adjusted under 35 U.S.C. 154(b) by 728 days.

(21) Appl. No.: 14/345,048

(22) PCT Filed: Jul. 31, 2012

(86) PCT No.: PCT/EP2012/064950
§ 371 (c)(1),
(2), (4) Date: Oct. 8, 2014

(87) PCT Pub. No.: WO2013/037557
PCT Pub. Date: Mar. 21, 2013

(65) Prior Publication Data
US 2015/0060609 A1    Mar. 5, 2015

(30) Foreign Application Priority Data
Sep. 16, 2011 (DE) .................. 10 2011 113 378

(51) Int. Cl.
*F16G 13/16* (2006.01)
*H02G 11/00* (2006.01)
*F16G 3/04* (2006.01)
*H02G 3/04* (2006.01)

(52) U.S. Cl.
CPC ............. *H02G 11/006* (2013.01); *F16G 3/04* (2013.01); *F16G 13/16* (2013.01); *H02G 3/0475* (2013.01); *H02G 11/00* (2013.01)

(58) Field of Classification Search
CPC ........... F16G 13/16; F16G 3/04; H02G 11/00; H02G 11/006; H02G 3/0475

USPC ......................................................... 59/78.1
See application file for complete search history.

(56) References Cited

U.S. PATENT DOCUMENTS

| 7,428,808 B2 * | 9/2008 | Utaki ................... H02G 11/006 248/49 |
| 7,513,096 B2 * | 4/2009 | Utaki ....................... F16G 13/16 248/49 |
| 2007/0228227 A1 | 10/2007 | Utaki et al. |

FOREIGN PATENT DOCUMENTS

| DE | 3522885 A1 | 1/1987 |
| DE | 102005061777 A1 | 6/2007 |
| DE | 102007010746 A1 | 10/2007 |
| DE | 102006027246 A1 | 12/2007 |
| DE | 202008008358 U1 | 8/2008 |

(Continued)

*Primary Examiner* — David B Jones
(74) *Attorney, Agent, or Firm* — BainwoodHuang

(57) ABSTRACT

A link of an energy chain has two parallel side flaps and at least one horizontal web. The two side flaps and the at least one horizontal web are connected to each other by positioning, pivoting and engaging. Two pivoting groups are provided, including in each case a contact surface and a relevant intake for positioning the contact surface in such a way that the pivoting groups in the positioned state form a pivoting axis transversely to the longitudinal axis of the chain link. Furthermore, two engagement groups are provided which in each case are formed by a locking element and a relevant abutment for receiving the locking element. A chain link can be assembled in a simple manner by a plurality of different horizontal webs and side flaps, wherein the connection between the horizontal web and the side flap cannot be randomly released.

11 Claims, 6 Drawing Sheets

(56) References Cited

FOREIGN PATENT DOCUMENTS

Figure 1:
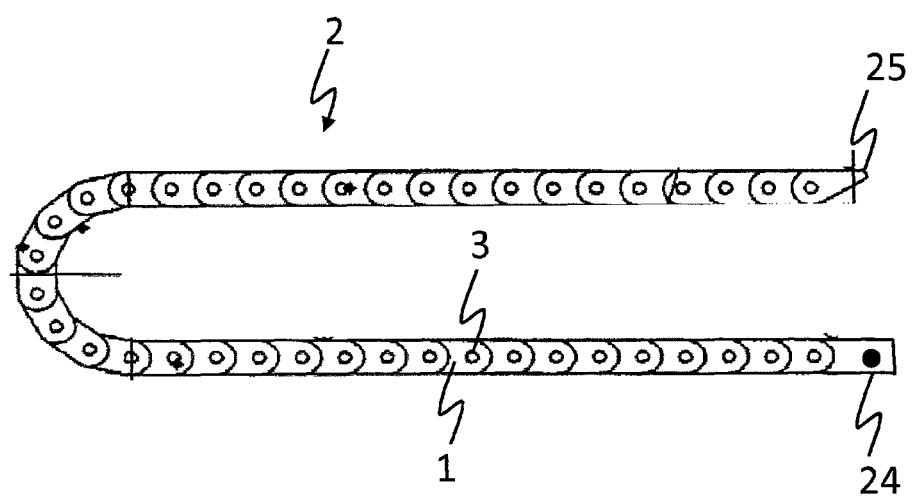

| | | |
|---|---|---|
| DE | 202009005650 U1 | 7/2009 |
| DE | 102008060466 A1 | 6/2010 |
| JP | 03079839 A | 4/1991 |
| JP | 2007247716 A | 9/2007 |
| JP | 2009264480 A | 11/2009 |

* cited by examiner

CHAIN LINK

The object of the invention relates to a chain link of an energy-conducting chain and to an energy-conducting chain having such a link.

Energy-conducting chains are used for guiding lines, cables, hoses, and the like between a locally fixed and a movable connection point. An energy-conducting chain is formed by means of a plurality of chain links. The chain links are connected with one another in an articulated manner. Each chain link comprises two tabs and at least one transverse crosspiece that can be connected or is connected with the tabs. The tabs and transverse crosspieces form a guide channel in which the lines, hoses or the like are disposed.

Chain links that have at least one transverse crosspiece that can be pivoted on a tab, about a pivot axis, are known from the state of the art. Such a transverse crosspiece has a snap hook on the opposite side, which can be releasably connected with the opposite tab.

Chain links in which the transverse crosspiece can be connected with the side tabs on both sides by means of insertion and engagement are also known from the state of the art. In general, such chain links provide connection elements with which the side tabs and the transverse crosspiece can be separated from one another.

In the known chain links, it can now happen, due to the effect of force, that the side tabs and the transverse crosspiece are unintentionally separated from one another.

It is therefore the task of the invention to relieve the problems described with regard to the state of the art, at least in part, and, in particular, to indicate a chain link in which the connection between side tab and transverse crosspiece cannot be accidentally released, and which, at the same time, is easy to assemble.

These tasks are accomplished with a chain link as disclosed herein. Further advantageous embodiments of the apparatus are indicated herein as well. The characteristics individually listed herein can be combined in any desired manner that makes technological sense, and can be supplemented with explanatory facts from the description, with further embodiment variants of the invention being shown.

These tasks are particularly accomplished with a chain link of an energy-conducting chain, having two parallel side tabs and at least one transverse crosspiece. The two side tabs and the at least one transverse crosspiece are connected with one another by being laid against, pivoted, and engaged into one another, where two pivot groups, which comprise a contact surface and a corresponding accommodation for having the contact surface make contact, in each instance, in such a manner that the pivot groups, in the contacted state, form a pivot axis transverse to the longitudinal axis of the chain link, and two engagement groups, which are formed by a locking element and a corresponding counter-bearing for accommodating the locking element, in each instance, are provided.

The longitudinal axis of the chain link means the direction in which the guided lines extend in the assembled state of the chain link. The chain link is delimited upward and/or downward by a respective transverse crosspiece, and by side tabs toward the sides. In particular, at least one element of the pivot group and one element of the engagement group are configured on the transverse crosspiece and a side tab, in each instance. The elements of the pivot group and of the engagement group are configured on the side tabs, particularly in an upper and/or lower region. The elements of the pivot group and the elements of the engagement group are configured on the transverse crosspiece in the end regions in the longitudinal axis of the chain link, particularly in the corner regions. Preferably, the accommodations of the two pivot groups are configured in a side tab, in each instance, and the two contact surfaces are configured in two end regions, preferably in two corner regions of the transverse crosspiece. The contact surfaces and the accommodations are shaped in such a manner that the contact surface can be laid into and/or onto the accommodations, and subsequently pivoting of the transverse crosspiece toward the side tabs can take place. In the contacted state, the two pivot groups thereby form a pivot axis, about which the transverse crosspiece can be pivoted. For this purpose, the contact surfaces and the accommodations have a profile similar to a semicircle, where the profiles similar to a semicircle can make a transition into a straight section, tangentially or at an angle. In the assembled state, the accommodation encloses the contact surface, in part, and particularly extends upward beyond the contact surface.

For a firm connection of the transverse crosspiece with the side tabs, the contacted transverse crosspiece is pivoted about the pivot axis until the elements of the engagement groups come into engagement with one another on the transverse crosspiece and the side tabs. The elements of the engagement group are disposed on the transverse crosspiece in the longitudinal direction, particularly on the end opposite the elements of the pivot groups. By means of the engagement of the locking element and of the counter-bearing, a force-fit and/or shape-fit connection between the transverse crosspiece and the side tabs takes place. In particular, the engagement groups are configured in such a manner that release of the engagement connection can only be brought about by means of the action of forces in opposite directions at two locations, particularly at the two side tabs. The engagement connections therefore have to be released simultaneously at the two side tabs so that the transverse crosspiece can be completely released from the side tabs.

According to the present invention, a chain link is thereby assembled in that a transverse crosspiece is laid against two parallel side tabs, is pivoted about a pivot axis formed by this contacting step, where the contact surface and the accommodation remain in contact and are firmly connected with one another by means of subsequent engagement. In this manner, it is particularly also made possible that transverse crosspieces that differ, for example in terms of their length transverse to the longitudinal axis of the chain link, can be connected with the same side tabs. In this way, a kind of modular system for chain links is produced.

According to an advantageous further development of the invention, the pivot groups prevent movement of the transverse crosspiece toward the side tab transverse to the longitudinal axis of the chain link. This is particularly achieved in that stop surfaces are formed on the transverse crosspiece and/or the side tab, within the elements of the pivot group, against which surfaces the transverse crosspiece and the side tabs lie transverse to the longitudinal axis of the chain link. Because such prevention of transverse movement is already achieved in the contacted state, contacting itself is simplified, on the one hand, and for another thing, the pivoting movement is guided. Furthermore, such transverse movement is suppressed also in the assembled state. Thereby the pivot group makes a contribution to the shape-fit connection between transverse crosspiece and side tabs.

According to another advantageous further development of the invention, at least one crosspiece is configured on the transverse crosspiece, toward the interior of the chain link, and a recess is formed in the side tabs for engaged accommodation of the crosspiece. The crosspiece particularly extends transverse to the longitudinal axis of the chain link and can thereby extend over the entire width of the transverse crosspiece, but also can be configured only in the end regions. The crosspiece is configured on the inner side of the transverse crosspiece, toward the conducting lines on the transverse crosspiece. The crosspiece has undercuts, particularly in the end region of the transverse crosspiece, so that the crosspiece can engage into the recess on the side tabs. Accordingly, the recess is configured in an upper and/or lower side of the side tabs and has a shape corresponding to the crosspiece. The crosspiece and the recess can form the locking element or the counter-bearing of the engagement group, but are preferably provided cumulatively to the engagement group, so that the transverse crosspiece engages into a side tab at two locations, in other words at a total of four locations with the two side tabs.

It is particularly preferred if a profile is configured for attachment of at least one crosspiece on the transverse crosspiece, toward the interior of the chain link. A profile means a component that is not connected with the transverse crosspiece with material fit, and is not produced in a work step together with it, in other words is attached to the transverse crosspiece only after its production. The component is referred to as a profile in the non-connected state, and in the connected state, the profile forms the crosspiece toward the interior of the chain link. This has the advantage that the crosspiece does not have to be produced in a work process with the transverse crosspiece, but rather can be subsequently connected with it. Because the crosspiece has undercuts in the end region, production simultaneously with the transverse crosspiece is only possible with great effort. Furthermore, in this way different crosspieces can be used in view of different requirements. Thus, the crosspiece can be adapted to the requirements of the lines to be conducted, without a complete transverse crosspiece having to be adapted. The crosspiece furthermore serves for attaching a separating crosspiece, which in turn can separate the lines to be conducted from one another.

In this connection, it is preferred that the transverse crosspiece has a niche for engaged accommodation of the profile, which niche extends transverse to the longitudinal axis of the chain link. Accordingly, the profile has a section that can be inserted to engage into the niche. By means of insertion of the profile into the niche, the profile can be connected with the transverse crosspiece with a few assembly steps. It is furthermore preferred that engagement projections extend on both sides along the niche, toward the interior of the chain link. The engagement projections guide the profile when it is inserted into the niche, for one thing, and for another thing form elements that support the engaged hold. In this connection, the engagement recesses form spring elements that engage with the profile.

Thus, it is also preferred that the engagement projections have contours for accommodation of the profile, which interact with and engage into contours of the profile. The contours of the engagement projections and of the profile extend in the direction of the longitudinal axis of the chain link in the assembled state, particularly in certain sections. The connection between transverse crosspiece and profile is made more secure by the contours.

According to another advantageous further development of the invention, the profile forms the locking element of the engagement group; in particular, the profile forms the locking element of both engagement groups.

According to yet another advantageous further development of the invention, the pivot group has a depression and a corresponding elevation that is introduced into the depression, which is disposed between pivot axis and engagement group. Preferably, the elevation is disposed on the side tab, and the depression is configured in the transverse crosspiece. By means of the elevation that engages into the depression, the pivot movement is guided, for one thing, and for another thing, the distance between the two side tabs during contacting and pivoting is predetermined in such a manner that the elements of the engagement group can engage into one another.

It is particularly preferred that the locking element is formed by a spring element having an engagement crosspiece, and the counter-bearing is formed by a corresponding engagement depression for accommodation of the engagement crosspiece. Preferably the spring element with engagement crosspiece is disposed on the transverse crosspiece, and the engagement depression is configured in a side tab. The spring element is particularly formed by a section that extends downward transverse to the longitudinal axis, connected in one piece with the transverse crosspiece, which section can be resiliently deflected outward transverse to the longitudinal axis. In this connection, the engagement crosspiece extends from this element in the direction of the chain link and engages into a corresponding engagement depression on an outside of the side tab. The engagement connection between side tab and transverse crosspiece can be released by means of deflecting the spring element outward.

According to another advantageous further development of the invention, the locking element extends in the longitudinal direction of the chain link, and the counter-bearing holds the locking element in the connected state by means of shape fit in the vertical direction. In particular, the locking element is configured on the transverse crosspiece at the end opposite to the pivot group, and the counter-bearing is correspondingly configured in the side tab.

According to another aspect of the invention, an energy-conducting chain comprising a plurality of chain links according to the invention is proposed. The energy-conducting chain particularly extends between a locally fixed and a movable connection point.

Figure 2:
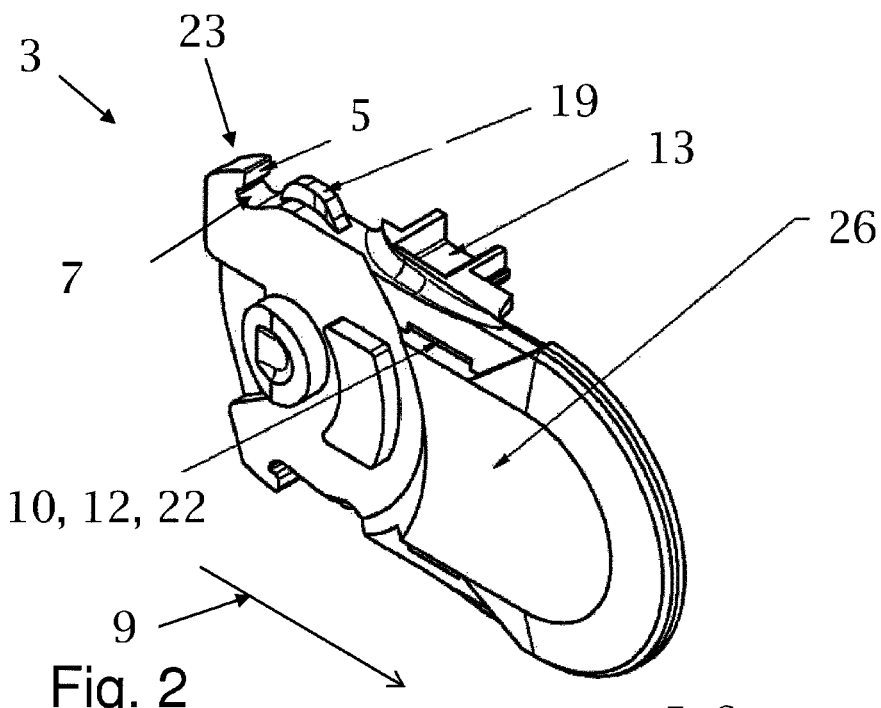
Figure 3:
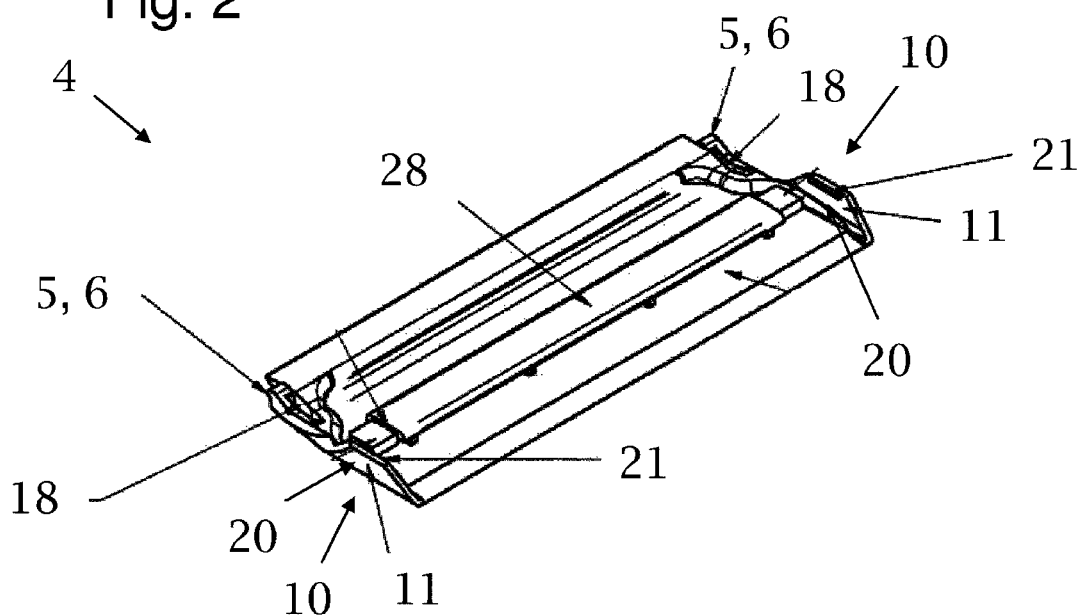
Figure 4:
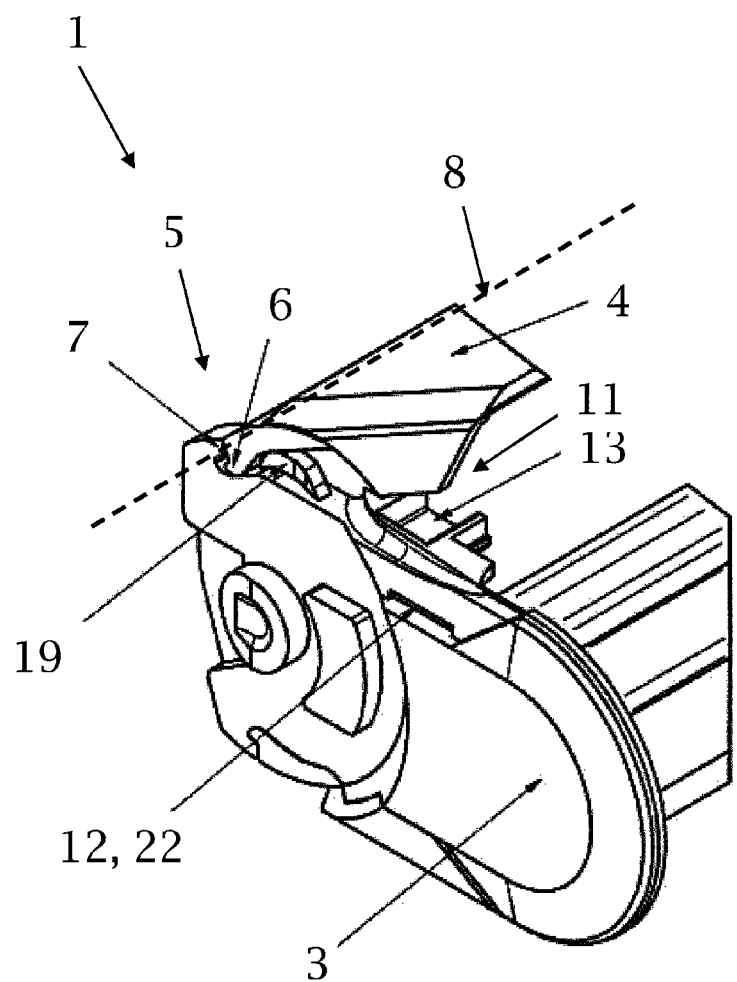
Figure 5:
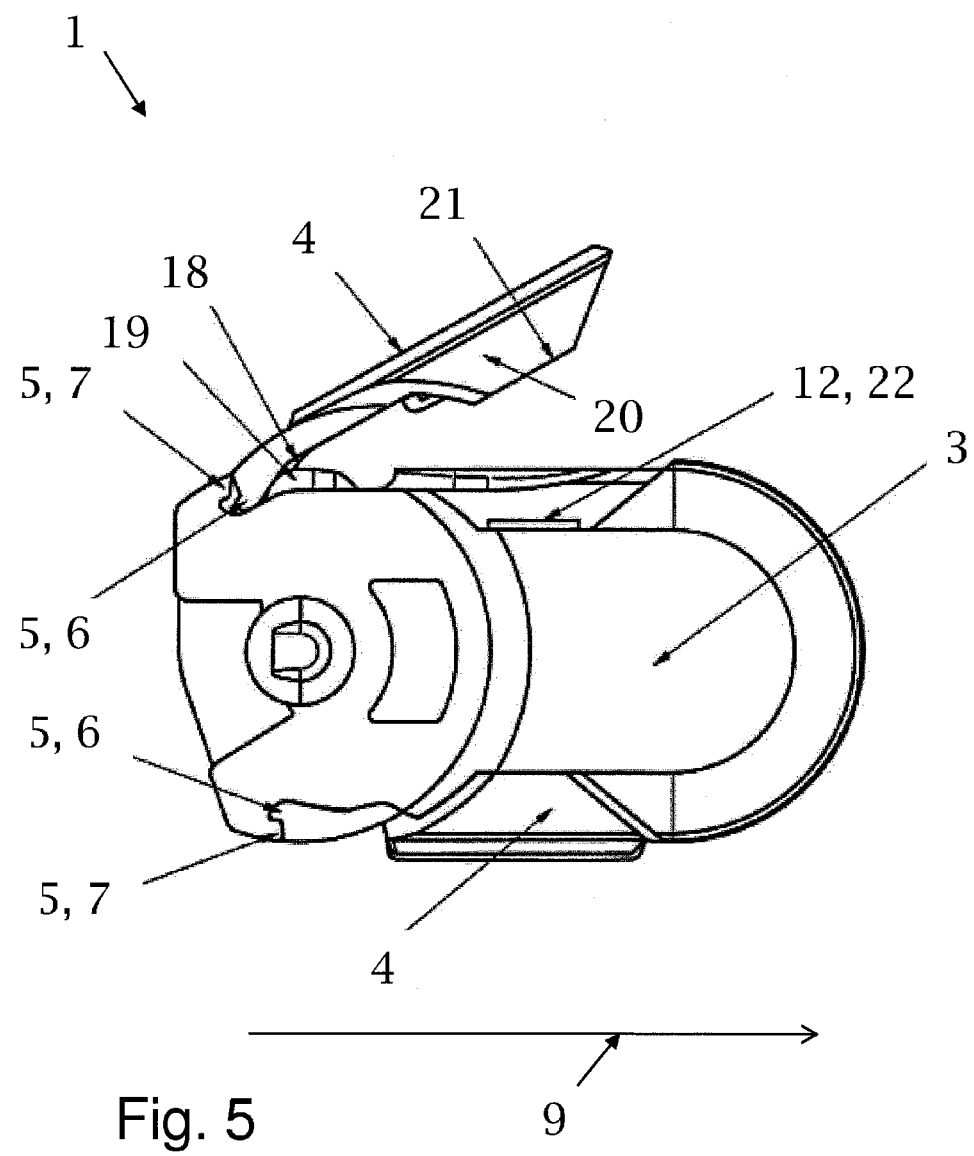
Figure 6:
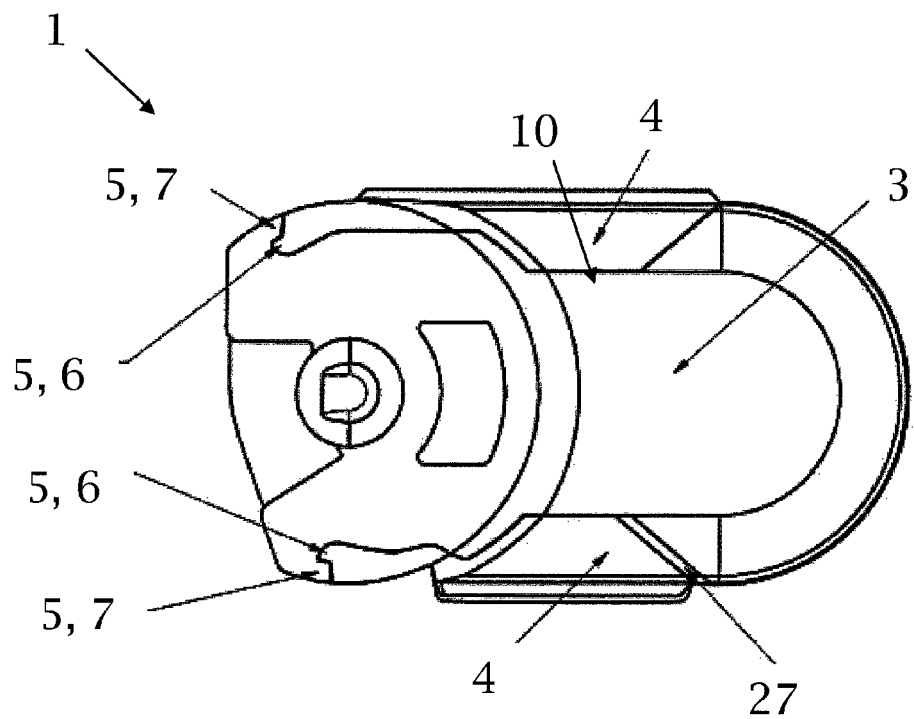
Figure 7:
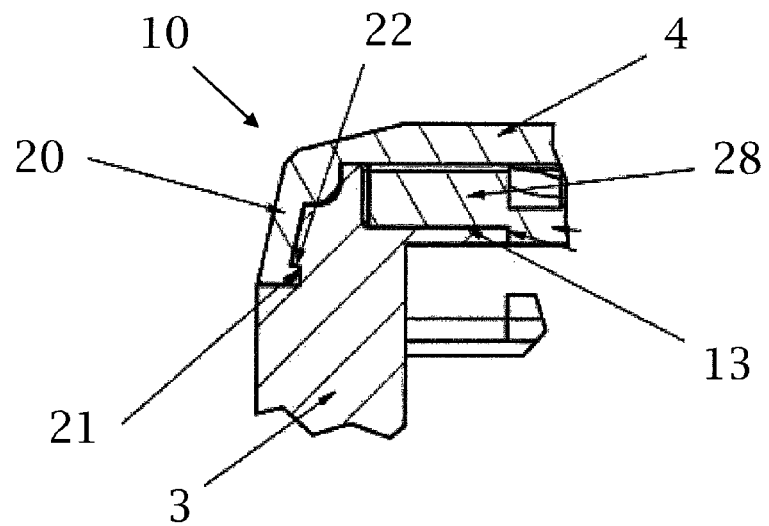
Figure 8:
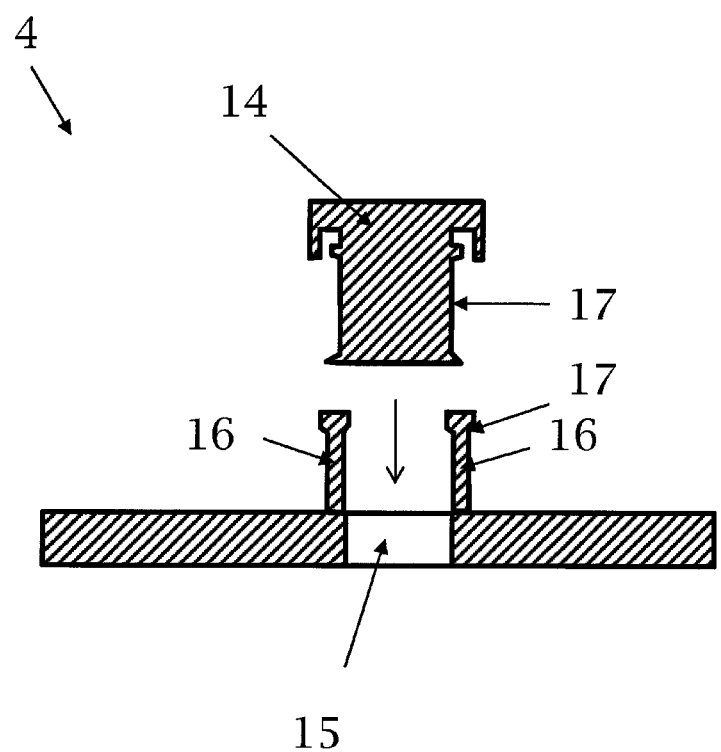

The invention as well as the technical environment will be explained below, using the figures as examples. It should be pointed out that the figures show particularly preferred embodiment variants of the invention, but the invention is not restricted to them. The drawings schematically show:

FIG. 1: an energy-conducting chain;

FIG. 2: a side tab of an embodiment of the chain link according to the invention, in a perspective view;

FIG. 3: a transverse crosspiece of an embodiment of the chain link according to the invention, in a perspective view;

FIG. 4: a chain link during assembly, in a perspective view;

FIG. 5: a chain link during assembly, in a side view;

FIG. 6: an assembled chain link, in a side view;

FIG. 7: a detail of a cross-section through an assembled chain link;

FIG. 8: a transverse crosspiece in a side view, in cross-section.

In FIG. 1, an energy-conducting chain 2 having a plurality of chain links 1 is shown, where the chain links 1 have side tabs 3, which are connected with one another in articulated manner by way of connection regions. The energy-conducting chain connects a locally fixed connection point 24 with a movable connection point 25. The chain links 1 generally have two side tabs 3 and at least one transverse crosspiece 4.

FIG. 2 shows, in a perspective view, a side tab 3 of an embodiment of a chain link 1 according to the invention. The side tab 3 extends in a longitudinal axis 9 and has a connection region 23 in an end region, in the direction of the longitudinal axis 9, by way of which region the side tab 3 can be connected with other side tabs 3 in articulated manner. In the representation of FIG. 2, an outside 26 of the side tab 3 can be seen. On a top side, the side tab 3 has an accommodation 7 that is an element of a pivot group 5. Furthermore, an elevation 19 is formed on the top, which is disposed, in the direction of the longitudinal axis 9, between the element of the pivot group 5 and an element of the engagement group 10. The element of the engagement group 10 is a counter-bearing 12 that is configured in the form of an engagement depression 22 and is situated on the outside 26 of the side tab 3. Furthermore, the side tab 3 has a recess 23 on the top, toward the inside.

In FIG. 3, a transverse crosspiece 4 is shown in a perspective representation, which can form a chain link 1 together with two side tabs 3. The transverse crosspiece 4 is shown with a side that forms the inner side of the chain link 1 in the assembled state and faces the lines to be conducted. The transverse crosspiece 4 also has elements of the pivot group 5 and of the engagement group 10. The element of the pivot group 5 is formed by a contact surface 6, in each instance, which is configured in a corner region of the transverse crosspiece 4. The elements of the engagement group 10 are formed by a locking element 11 that has a spring element 20 and an engagement crosspiece 21. A depression 18 is formed on the outside, on the transverse crosspiece 4, between the pivot group 5 and the elements of the engagement group 10. Furthermore, the transverse crosspiece 4 has a crosspiece 28 on its inner side, which extends transverse to the longitudinal axis 9 of the chain link 1.

In FIG. 4, a detail of a chain link 1 with a side tab 3 according to FIG. 2 and a transverse crosspiece 4 according to FIG. 3 is shown in an instantaneous image during assembly, in a perspective view. In the assembly state shown here, the contact surface 6 of the pivot group 5 was laid against the accommodation 7 of the pivot group 5. Accordingly, the other contact surface 6 (not shown) was also brought into contact with the other accommodation 7 of the side tab 3, not shown. A pivot axis 8 is configured by means of contacting of the elements of the pivot group 5. Subsequently, the transverse crosspiece 4 is pivoted about the pivot axis 8, toward the side tab 3, where the elevation 19 engages into the depression 18 and guides the pivoting process. At the end of the pivoting process, the locking element 11 and the counter-bearing interact by engaging into one another. Furthermore, the crosspiece 28 engages into the recess 13.

FIG. 5 shows the assembled state according to FIG. 4 in a side view, where the lower side tab 4 has already been assembled. The upper side tab 4 has been brought into contact with the accommodation 7 by way of the contact surface 6. During the subsequent pivoting process, the elevation 19 engages into the depression 18, so that the pivoting process is guided and a distance between the side tabs 3 is established. At the end of the pivoting process, the engagement crosspiece 21 engages into the counter-bearing 12 formed by an engagement depression 22. In this connection, the spring element 20 is deflected outward transverse to the longitudinal axis 9 of the chain link.

FIG. 6 schematically shows an assembled chain link 1 in a side view. The transverse crosspiece 4 and the side tabs 3 were connected with one another in that the elements of the pivot group 5 were brought into engagement with one another and that the elements of the engagement group 10 were engaged into one another. An opening slot 27 is configured between the side tab 3 and the transverse crosspiece 4, which can be used to release the engagement connection of the elements of the engagement group 10, in that the spring element 20 is deflected outward.

FIG. 7 shows a detail of a cross-section through the assembled chain links according to FIG. 6 in the region of the engagement group 10. The transverse crosspiece 4 is connected with a crosspiece 28 that is disposed in the recess 13 and there is connected with the side tab 3, particularly with engagement. Furthermore, the elements of the engagement group 10 are shown, where a spring element 20 having an engagement crosspiece 21 is configured on the transverse crosspiece 4. The engagement crosspiece 21 stands in engagement with an engagement depression 22. In order to release the transverse crosspiece 4 from the side tab 3, the spring element 20 can be deflected outward with the engagement crosspiece 21. In order for the chain link 1 to be completely disassembled, however, the spring elements 20 would have to be simultaneously deflected outward at both side tabs.

FIG. 8 shows a transverse crosspiece 4 in a cross-sectional view, and a profile 14. The transverse crosspiece 4 has a niche 15 and engagement projections 16 that extend upward at the edge of the niche 15 and have a contour 17. The profile 14 also has a contour 17 and can be introduced into the niche 15 by means of the engagement projections 16, where it is connected by engagement with the transverse crosspiece 4. In the connected state, the profile 14 forms a crosspiece 28.

By means of the present invention, a chain link 1 is indicated that can be built up in simple manner from a plurality of different transverse crosspieces 4 and side tabs 4, where the connection between transverse crosspiece 4 and side tab 3 cannot be unintentionally released.

REFERENCE SYMBOL LIST 1 chain link
2 energy-guiding chain
3 side tab
4 transverse crosspiece
5 pivot group
6 contact surface
7 accommodation
8 pivot axis
9 longitudinal axis
10 engagement group
11 locking element
12 counter-bearing
13 recess
14 profile
15 niche
16 engagement projection
17 contour
18 depression
19 elevation
20 spring element
21 engagement crosspiece
22 engagement depression
23 connection region
24 fixed connection point
25 movable connection point
26 outside
27 opening slot
28 crosspiece

The invention claimed is:

1. Chain link of an energy-conducting chain, comprising:
   two parallel side tabs, and
   at least one transverse crosspiece,
   wherein the two side tabs couple with each transverse crosspiece via a contact-pivot-engage process,
   wherein each side tab defines an accommodation, and a counter-bearing having an engagement depression on an outer side of the side tab that accommodates an engagement crosspiece,
   wherein each transverse crosspiece defines a set of contact surfaces and a set of locking elements, each locking element including a spring element having an engagement crosspiece,
   wherein each transverse crosspiece and the two side tabs are constructed and arranged to form two pivot groups, each pivot group being formed by a contact surface of that transverse crosspiece and an accommodation of a side tab that contacts the contact surface, each pivot group providing a pivot axis transverse to a longitudinal axis defined by the chain link, and
   wherein each transverse crosspiece and the two side tabs are further constructed and arranged to form two engagement groups, each engagement group being formed by a locking element of that transverse crosspiece and a counter-bearing of a side tab that accommodates the locking element.

2. Chain link according to claim 1, wherein, for each transverse crosspiece, the pivot groups prevent movement of the transverse crosspiece toward the side tabs, transverse to the longitudinal axis of the chain link.

3. Chain link according to claim 1, wherein at least one crosspiece structure is configured on the transverse crosspiece, toward an interior of the chain link, and a recess is configured in each side tab to engage the crosspiece structure.

4. Chain link according to claim 1, wherein the pivot group has a depression and a corresponding elevation that is introduced into the depression, which is disposed between the pivot axis and engagement group.

5. Chain link according to claim 1, wherein the locking element is formed by a spring element having an engagement crosspiece, and the counter-bearing is formed by a corresponding engagement depression for accommodation of the engagement crosspiece.

6. Chain link of an energy-conducting chain, comprising:
   two parallel side tabs, and
   at least one transverse crosspiece,
   wherein the two side tabs couple with each transverse crosspiece via a contact-pivot-engage process,
   wherein each side tab defines an accommodation and counter-bearing,
   wherein each transverse crosspiece defines a set of contact surfaces and a set of locking elements,
   wherein each transverse crosspiece and the two side tabs are constructed and arranged to form two pivot groups, each pivot group being formed by a contact surface of that transverse crosspiece and an accommodation of a side tab that contacts the contact surface, each pivot group providing a pivot axis transverse to a longitudinal axis defined by the chain link, and
   wherein each transverse crosspiece and the two side tabs are further constructed and arranged to form two engagement groups, each engagement group being formed by a locking element of that transverse crosspiece and a counter-bearing of a side tab that accommodates the locking element, wherein a profile is configured for attachment of at least one crosspiece structure on the transverse crosspiece, toward an interior of the chain link.

7. Chain link according to claim 6, wherein the transverse crosspiece has a niche for engaged accommodation of the profile, which niche extends transverse to the longitudinal axis of the chain link.

8. Chain link according to claim 7, wherein engagement projections extend on both sides along the niche, toward the interior of the chain link.

9. Chain link according to claim 8, wherein the engagement projections have contours for accommodation of the profile, which interact with and engage into contours of the profile.

10. Chain link according to claim 6, wherein the profile used as a crosspiece forms the locking element of the engagement group and the recess forms the counter-bearing.

11. Energy-guiding chain, comprising:
    a plurality of chain links, each chain link having:
    two parallel side tabs, and
    at least one transverse crosspiece,
    wherein the two side tabs couple with each transverse crosspiece via a contact-pivot-engage process,
    wherein each side tab defines an accommodation, and a counter-bearing having an engagement depression on an outer side of the side tab that accommodates an engagement crosspiece,
    wherein each transverse crosspiece defines a set of contact surfaces and a set of locking elements, each locking element including a spring element having an engagement crosspiece,
    wherein each transverse crosspiece and the two side tabs are constructed and arranged to form two pivot groups, each pivot group being formed by a contact surface of that transverse crosspiece and an accommodation of a side tab that contacts the contact surface, each pivot group providing a pivot axis transverse to a longitudinal axis defined by the chain link, and
    wherein each transverse crosspiece and the two side tabs are further constructed and arranged to form two engagement groups, each engagement group being formed by a locking element of that transverse crosspiece and a counter-bearing of a side tab that accommodates the locking element.

\* \* \* \* \*